(12) United States Patent
Mettan et al.

(10) Patent No.: US 9,023,527 B2
(45) Date of Patent: May 5, 2015

(54) $H_4V_3O_8$, A NEW VANADIUM(IV) OXIDE ELECTROACTIVE MATERIAL FOR AQUEOUS AND NON AQUEOUS BATTERIES (71) Applicant: Belenos Clean Power Holding AG, Bienne (CH)

(72) Inventors: Yoan Mettan, Evionnaz (CH); Reinhard Nesper, Amden (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 13/712,119

(22) Filed: Dec. 12, 2012

(65) Prior Publication Data

US 2013/0157138 A1 Jun. 20, 2013

(30) Foreign Application Priority Data

Dec. 20, 2011 (EP) ..................................... 11194585
Dec. 22, 2011 (EP) ..................................... 11195376

(51) Int. Cl.
*H01M 4/485* (2010.01)
*H01M 4/04* (2006.01)

(52) U.S. Cl.
CPC ............ *H01M 4/485* (2013.01); *H01M 4/0404* (2013.01); *H01M 4/049* (2013.01)

(58) Field of Classification Search
CPC .... H01M 4/485; H01M 4/0404; H01M 4/049
USPC ..................................................... 429/231.5
See application file for complete search history.

(56) References Cited

U.S. PATENT DOCUMENTS

2010/0112440 A1* 5/2010 Guyomard et al. ........... 429/217
2012/0100402 A1 4/2012 Nesper et al.

FOREIGN PATENT DOCUMENTS

EP 2 445 049 A1 4/2012

OTHER PUBLICATIONS

European Search Report issued Jun. 13, 2012 in corresponding European Application No. 11 19 5376 filed on Dec. 22, 2011.
Yoann Patrice Mettan, "$H_2V_3O_8$-Electroactive Material for Lithium Batteries and—Template for the Synthesis of Functional Nanomaterials", In: "Doctoral and Habilitation Thesis No. 19382", May 14, 2011, Eidgenoessische Technische Hochschule ETH Zuerich, Zuerich, XP 55029650, 7 Pages.
Vanessa Legagneur et al., "New layered vanadium oxides $MyH_{1-y}V_3O_8 \cdot nH_2O$ (M=Li, Na, K) obtained by oxidation of the precursor $H_2V_3O_8$", Journal of Materials Chemistry, The Royal Society of Chemistry, Cambridge, GB, vol. 10, No. 12, Nov. 6, 2000, XP 002636962, pp. 2805-2810.

* cited by examiner

*Primary Examiner* — Nicholas P D'Aniello
(74) *Attorney, Agent, or Firm* — Oblon, McClelland, Maier & Neustadt, L.L.P.

(57) ABSTRACT

A new electroactive material of formula $H_4V_3O_8$ obtainable from $H_2V_3O_8$ is described as well as a method for its production, an electroactive cathode coating material comprising this electroactive material, a method for its production and cathodes as well as aqueous and non aqueous, rechargeable and non rechargeable batteries comprising such cathodes.

13 Claims, 10 Drawing Sheets

$H_4V_3O_8$, A NEW VANADIUM(IV) OXIDE ELECTROACTIVE MATERIAL FOR AQUEOUS AND NON AQUEOUS BATTERIES

This application claims priority from European Patent Application No. 11194585.3 filed Dec. 20, 2011 and from European Patent Application No. 11195376.6 filed Dec. 22, 2011, the entire disclosure of which is incorporated herein by reference

TECHNICAL FIELD

The present invention concerns a new electroactive cathode material suitable for non-aqueous and aqueous rechargeable batteries.

BACKGROUND OF THE INVENTION

Aqueous lithium ion batteries are currently being developed and present several advantages over conventional alkaline, nickel metal hydride (NiMH) or lead acid batteries [1]. The pH of the electrolyte used in aqueous lithium batteries is close to 7, which makes these systems inherently safer.

Though non aqueous lithium ion batteries have a better energy density because of the higher voltage available in organic electrolytes, they are hazardous, expensive and contain highly toxic chemicals in their current state. In comparison, an aqueous lithium battery is safe, cheap and environmentally friendly.

Aqueous mixed lithium/proton batteries offer the perspective of storing more energy than proton or lithium batteries do independently [2].

Synthetic or natural vanadium(IV) oxide compounds are of interest in fundamental research [3] and for industrial applications [4] because of their structural peculiarities and their extended redox properties.

$H_2V_3O_8$ is a known compound that has already been described in 1970 [5] and that was structurally analyzed in 1990 [6]. Its composition and structure has been modified in several ways in order to improve its use as electrode material in batteries. However, only the compounds obtained by oxidation to an all vanadium(V) oxohydroxide in which part of the hydrogen has been substituted by alcaline metal cations have been described so far [7]. So far practically no compounds obtained by reduction of $H_2V_3O_8$, in which the oxidation states of the vanadium are mixed 4+/5+, only 4+ or 4+/3+, have been characterized. One exception is [8], in which $Li_xH_2V_3O_8$ phases are described.

A V(IV) compound is known in the form of the mineral doloresite [9] that is a hydrated form of $VO_2$. Doloresite is of monoclinic symmetry with a=19.64±0.06, b=2.99±0.01, c=4.89±0.02 and β=103°55'±5' [9]. Doloresite can be formulated as $V_3O_4(OH)_4$ or $H_4V_3O_8$.

Hence, it is a general object of the invention to provide a compound that can accommodate reversibly both lithium ions and protons.

DISCLOSURE OF THE INVENTION

Now, in order to implement these and still further objects of the invention, which will become more readily apparent as the description proceeds, according to a first definition, the electroactive cathode material is manifested by the features that it is $H_4V_3O_8$, obtainable from the precursor $H_2V_3O_8$(Pnma), optionally in one of its loaded/deloaded states. Such electroactive cathode material based on $H_4V_3O_8$ and encompassing loaded and deloaded states may also be described as $Li_xH_yV_3O_8$ with 2<x+y<6.8 and 0<x<4 and 0.5<y<6, with the proviso that it is not the precursor $H_2V_3O_8$(Pnma).

According to an alternative second definition, the electroactive cathode material is manifested by the features that it is $H_4V_3O_8$ in the form of a layered compound with a structure belonging to the space group Pnma (n62).

The electroactive material of the present invention is suitable for rechargeable batteries and non rechargeable batteries as well.

The $H_4V_3O_8$ of the present invention is structurally closely related to $H_2V_3O_8$(Pnma). Contrary thereto the mineral doloresite [9], although its formula may be written as $V_3O_4(OH)_4$ or $H_4V_3O_8$, possesses a different crystal structure and different physico-chemical properties and therefore is easily distinguishable from the compound of the present invention. Thus, in order to clearly distinguish doloresite from the compound of the present invention, the formula of doloresite will further on be referred to as $V_3O_4(OH)_4$ and the one of the present invention as $H_4V_3O_8$.

$H_4V_3O_8$ is obtainable by reduction of $H_2V_3O_8$ according to the following reaction:

Below, this reaction is called the protonation of $H_2V_3O_8$.

$H_4V_3O_8$ can be synthesized starting from $H_2V_3O_8$, a proton source and a reducing agent. The reaction is suitably carried out in a solvent, preferentially water, and preferably in water at a pH of, or close to, 7. The temperature can be varied in a broad range of usually 90 to 10° C. but is preferably performed in a range of 20 to 30° C., most preferred at about 25° C.

In principle any proton source can be used in combination with any strong reducing agent. Some examples for suitable proton sources and reducing agents are

- ascorbic acid (presumably predominantly proton source) and hydrazine ($N_2H_4 \cdot H_2O$) (reducing agent)
- ascorbic acid (may act as both, proton source and reducing agent)
- zinc (reducing agent) and sulphuric acid (proton source)

If needed in order to achieve the desired pH, a base may be added such as aqueous $NH_4OH$.

In batteries the reduction or oxidation of the transition metal is accompanied by the insertion respectively the deinsertion of protons or alkaline cations or alkaline earth cations. This mechanism ensures the charge conservation within the electroactive material.

In rechargeable batteries, the reversibility, efficiency and extent of the ion insertion represent the critical parameters of the electroactive material. In this regard, and based on experimental support, $H_4V_3O_8$ appears a good candidate as cathodic material in non aqueous lithium batteries.

In the scope of the present invention the reversible intercalation of 2.3 $Li^+$ eq. in $H_4V_3O_8$ was demonstrated. Hitherto performed investigations suggest that similar performances could be obtained in non aqueous sodium batteries.

An additional benefit of the materials of the present invention is that they can be used for forming the electroactive material coating of a current collector or guidewire (further on referred to as current collector only) in mere admixture with conductive carbon, e.g. Super P® Li carbon black (TIMCAL®), i.e. no binder is necessary to provide a sufficiently stable coating. This advantage in forming the electroactive electrode material is assumed to be at least in part due to the fibrous structure of the $H_4V_3O_8$.

The electroactive material of the present invention is in the form of nanoparticles, in particular nanofibers or microfibers, i.e. elongated particles with one dimension exceeding the other dimensions for at least about 20 times. Preferred dimensions of nanofibers/microfibers are a width of less than 200 nm, preferably about 100 nm and a length of up to about 100 μm, preferably about 10 μm.

Usual particle sizes for non elongated particles, e.g. the conductive particles such as the conductive carbon black and—if the optional conductive binder particles are present—the binder particles are e.g. <500 nm, in particular nanoparticles having an average particle size in the range of 5 to 500 nm, preferably in the range of 5 to 400 nm, more preferred in the range of 20 to 300 nm.

For Super P® Li (TIMCAL) an average primary particle size from TEM pictures of 40 nm is reported by the manufacturer.

BRIEF DESCRIPTION OF THE DRAWINGS

The invention will be better understood and objects other than those set forth above will become apparent when consideration is given to the following detailed description thereof. Such description makes reference to the annexed drawings, wherein.

Unless otherwise specified, the conditions are those described in the examples below.

MODES FOR CARRYING OUT THE INVENTION

The basic material of the invention is $H_4V_3O_8$ obtainable from $H_2V_3O_8$, in particular by a method comprising treating $H_2V_3O_8$ with a proton source and a reducing agent in a solvent.

Suitable proton sources and the reducing agents are e.g.
(i) ascorbic acid, or
(ii) ascorbic acid and hydrazine ($N_2H_2.H_2O$), or
(iii) zinc and $H_2SO_4$.

A suitable and preferred solvent is water, in particular water at a pH of 5 to 8, much preferred close to 7. The reaction temperature may practically vary from 100° C. to 0° C., preferably 80 to 10° C., however the treatment is usually performed at a temperature of 20 to 30° C., in particular about 25° C.

A $H_4V_3O_8$ produced as outlined above, was found to have refined cell parameters determined by Rietveld refinement for orthorhombic $H_4V_3O_8$(Pnma, n62) of $$a=16.3306 \quad b=3.7642 \quad c=9.2705$$

wherein the Rietveld refinement is performed using the refined cell parameters for orthorhombic H2V3O8(Pnma, n62) of a=17.1885, b=3.5796 and c=9.249 as starting point.

The $H_4V_3O_8$ produced as mentioned above is in the form of fibers having a width of less than 200 nm, preferably about 100 nm and a length of up to about 100 μm, preferably about 10 μm.

Such $H_4V_3O_8$ may be subjected to lithiation/delithiation and/or protonation/deprotonation thereby resulting in a compound that may be described by the general formula $Li_xH_yV_3O_8$, wherein 2<x+y<6.8 and 0<x<4 and 0.5<y<6. Such compound is e.g. obtainable by electrochemistry.

$H_4V_3O_8$ as well as $Li_xH_yV_3O_8$, wherein 2<x+y<6.8 and 0<x<4 and 0.5<y<6 may be used as electroactive material in aqueous and non aqueous rechargeable and non rechargeable batteries. The presently preferred starting material for producing an electrode, however, is $H_4V_3O_8$. Indeed, as the cell parameters change only very little as the result of the lithium intercalation/deintercalation, this material has a good stability over various intercalation/deintercalation cycles since few mechanical work has to be performed and therefore the electrode coating remains intact.

If the electroactive material after synthesis has too large particles, e.g. fibers, it may be gently pestled before use. Gently in this connection means that the pestling conditions shall be chosen such that the particle sizes are reduced to the desired sizes only. Suitable conditions can easily be determined by the skilled person.

The electroactive material is used in mixture with nanoparticulate conductive material, in particular conductive carbon black. Optionally, but not necessarily also preferably nanoparticulate binder may be present, however since a mixture consisting of electroactive material and conductive carbon black proved to be sufficiently stable to be used without usual binder component, such binary composition is preferred.

Suitable binders (if using binders is desired) are e.g. polyvinylidene fluoride, or an electrically conducting nanoparticulate binder, such as PEDOT (Poly(3,4-ethylenedioxythiophene).

As indicated above, $H_4V_3O_8$ may be produced from $H_2V_3O_8$ by a method wherein $H_2V_3O_8$ is treated with a proton source and a reducing agent in a solvent. Preferred conditions have already been defined above.

As an alternative that, however, is less preferred, $H_4V_3O_8$ may be obtained electrochemically from $H_2V_3O_8$, e.g. at 100 A/kg in an aqueous electrolyte (e.g. 3 M $NH_4Cl$) and with e.g. Zn as anode.

Also encompassed by the present invention are an electroactive cathode material containing or consisting of an electroactive compound as defined above and a nanoparticulate conductive material, in particular conductive carbon black and a cathode comprising a current collector coated with such electroactive cathode material.

Such cathode may be produced in that electroactive material as defined above is mixed and homogenized with conductive carbon black, optionally followed by gentle pestling and/or solvent evaporation to obtain desired fibre dimensions and viscosity, coating a current collector and drying.

Good mechanical stability is e.g. obtained by mixing the electroactive material with conductive carbon black, e.g. Super P® Li conductive carbon black (TIMCAL), in a 7:3 weight-ratio in a solvent, for example tetrahydrofuran (THF). One should not that a great many other solvents could alternatively be used. Suitable solvents can be organic as well as inorganic, protic as well as aprotic. Homogenization may occur during mixing or subsequent to the mixing, e.g. by ultrasound. Such homogenization usually is only performed for from a few seconds to a few minutes. Indeed, mixing for too long can damage the material.

In order to obtain a coating composition that may be used for coating a current collector, some of the solvent, e.g. THF may be evaporated during pestling. A suitable current collector is a titanium current collector, although other inert conductive materials may be used. The coating or the electrode, respectively, may be dried in air, pressed by hand to further compact the coating and to improve the drying, and further dried in vacuum. During this final drying, the environment (gas phase) is preferably renewed by performing at least two, preferably at least three purges. The time usually needed for the final drying with the mentioned minimal number of purges usually is around 30 minutes Such electrodes are suitable for being used in non aqueous or aqueous lithium batteries.

A suitable electrolyte for a non aqueous lithium battery is e.g. an electrolyte consisting of 1M $LiPF_6$ in a mixture of ethylene carbonate and dimethyl carbonate (e.g. 1:1 or 2:1 by weight). Suitable anodes are lithium metal or an anode comprising as electroactive anode material vanadium nitride or vanadium carbide but much preferred vanadium nitride, in particular nanoparticulate vanadium nitride or carbide, preferably vanadium nitride ($VN_x$) of type VN, i.e. with x=1, much preferred with rock-salt structure. Such preferred nitrides and carbides are generally referred to as interstitial nitrides and carbides.

Suitable separators are e.g. polymer fibre sheet materials such as microporous polypropylene sheets. Examples of suitable separators are e.g. a Celgard® polypropylene separator and/or a silica foam separator and/or a nylon sheet material.

The cathode may be prepared as described above and then further processed into a cell by covering the electrode with at least one separator and then filling the cell with electrolyte, completing the cell with an anode and then tightly closing the cell.

A suitable electrolyte for an aqueous lithium and proton battery is e.g. an electrolyte comprising a soluble lithium salt like LiCl, $LiNO_3$ or LiOH, or an acid, e.g. an electrolyte consisting of either 3M LiCl or 5M $LiNO_3$ or 3M $NH_4Cl$, for a lithium ion cell or a proton cell, respectively. The electrolyte solutions preferably are degassed, e.g. by ultrasound.

A zinc plate may be used as anode and reference electrode. Other suitable anodes are Manganese, Aluminium, Iron, Chromium or another element with a reduction potential smaller than −0.3 Volt.

The cathode may be prepared as described above.

Such electrode may be further processed into a cell by covering the electrode with at least one separator (see above) and then filling the cell with electrolyte, completing the cell with an anode and then tightly closing the cell.

The invention is now further described by means of some specific examples.

Synthesis

General Procedure $H_4V_3O_8$ was synthesized from $H_2V_3O_8$, a proton source and a reducing agent. The reaction was carried out in a solvent, preferentially water, at a variable range of temperature, preferably at 25° C.

Method #1: Ascorbic Acid and Hydrazine

200 mg of $H_2V_3O_8$ were dispersed in 100 ml deionized water. The resulting suspension was stirred vigorously until the suspension turned to a black-green colour indicating completion of the reaction. The pH of the suspension was brought to 9-10 by the addition of $N_2H_4 \cdot H_2O$. Immediately afterwards, the reaction mixture was neutralized by ascorbic acid. The green solid turned dark brown upon addition of ascorbic acid. The brown product was collected by filtration, washed twice with deionized water and once with acetonitrile. After vacuum drying for 4 h at 25° C., $H_4V_3O_8$ was kept in an argon-filled glove box. Approximately 20% by weight of the solid $H_2V_3O_8$ dissolved during the reaction and could not be recovered.

Method #2: Ascorbic Acid and Ammonia 200 mg of $H_2V_3O_8$ were dispersed in 100 ml deionized water. The resulting suspension was stirred vigorously until completion of the reaction (see method #1). 500 mg of ascorbic acid were added to the suspension. After 5 min, the pH was adjusted to 7 with 0.2 ml of 25% $NH_4OH$. The resulting mixture was warmed to 80° C. on a hotplate until the solid had turned brown, i.e. for approximately 30 min. The brown product was collected by filtration, washed twice with deionized water and once with acetonitrile. After vacuum drying for 4 h at 25° C., $H_4V_3O_8$ was kept in an argon-filled glove box. The reaction was quantitative.

Method #3: Zinc and Sulfuric Acid 200 mg of $H_2V_3O_8$ were dispersed in 75 ml deionized water. The resulting suspension was stirred vigorously until completion of the reaction (see method #1). 50 mg Zn powder were added to the suspension. The mixture was then homogenized by ultrasound for a few seconds. Subsequently, a solution of 0.045 ml 98% $H_2SO_4$ in 25 ml deionized water was added dropwise (approx. 1 drop every 2 seconds). The solid turned first dark blue and then brown over time. About one hour after all the sulphuric acid had been added, the pH of the reaction mixture equilibrated between 5 and 7, which indicated that all the $H_2V_3O_8$ had been converted to $H_4V_3O_8$. The brown product was collected by filtration, washed twice with deionized water and once with acetonitrile. After vacuum drying for 4 h at 25 C, the $H_4V_3O_8$ was kept in an argon-filled glove box. The reaction was quantitative:

$$H_2V_3O_8(s) + Zn(s) + H_2SO_4(aq) \rightarrow H_4V_3O_8(s) + ZnSO_4(aq)$$

Elemental Analysis

All the $H_4V_3O_8$ samples submitted for elemental analysis contained amounts of carbon and nitrogen below 0.4% by weight. The hydrogen content was found to lie between 1.3% by weight and 1.5% by weight, which is consistent with the expectation value of 1.4% by weight for $H_4V_3O_8$. 0.7% by weight was found in $H_2V_3O_8$.

XRD Powder Analysis

The XRD (CuKa) powder pattern of $H_4V_3O_8$ was measured. The pattern looks related to $H_2V_3O_8$ but different. The patterns for different chemical synthesis and synthesis by electrochemical protonation did not differ (see FIGS. 2, 3, 4, 9, and 11)

Figure 5:
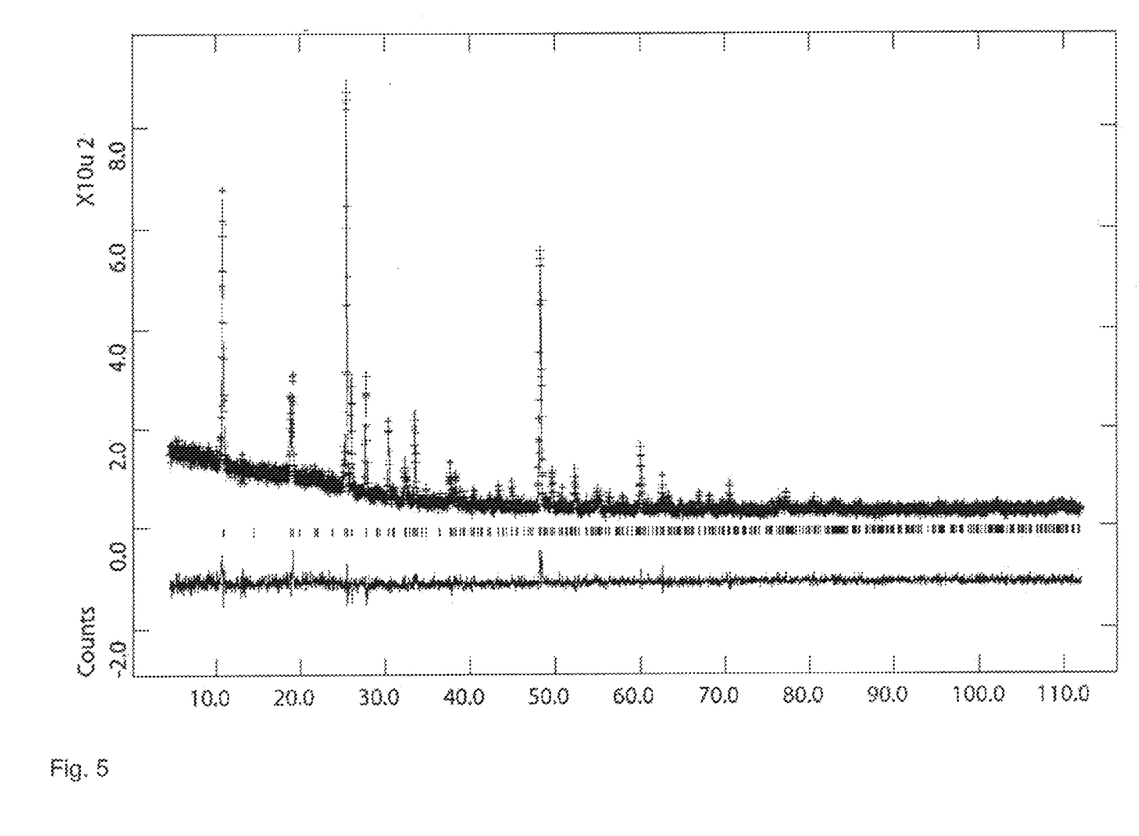
FIG. 5 shows Rietveld refinement of $H_4V_3O_8$(Pnma)

Rietveld refinement was performed using the structure of $H_2V_3O_8$ [6] as a starting point (see FIG. 5). A good fit of the experimental data could be obtained. The refined cell parameters for orthorhombic $H_4V_3O_8$ (Pnma, n62):

$$a=16.3306 b=3.7642 c=9.2705$$

The refined cell parameters for orthorhombic $H_2V_3O_8$ (Pnma, n62):

$$a=17.1885 b=3.5796 c=9.249$$

Figure 6:
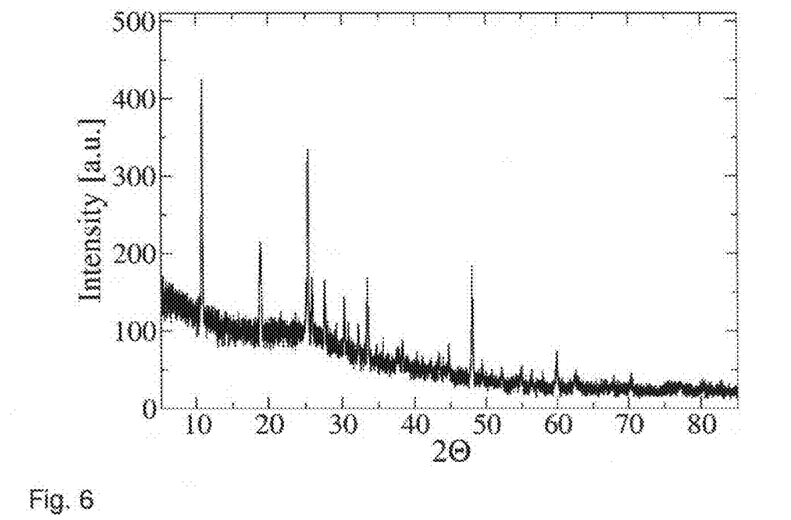
FIG. 6 shows the XRD pattern of $H_5V_3O_8$ synthesized electrochemically at 100 A/kg (NH4Cl aqueous electrolyte and zinc anode).
Figure 7:
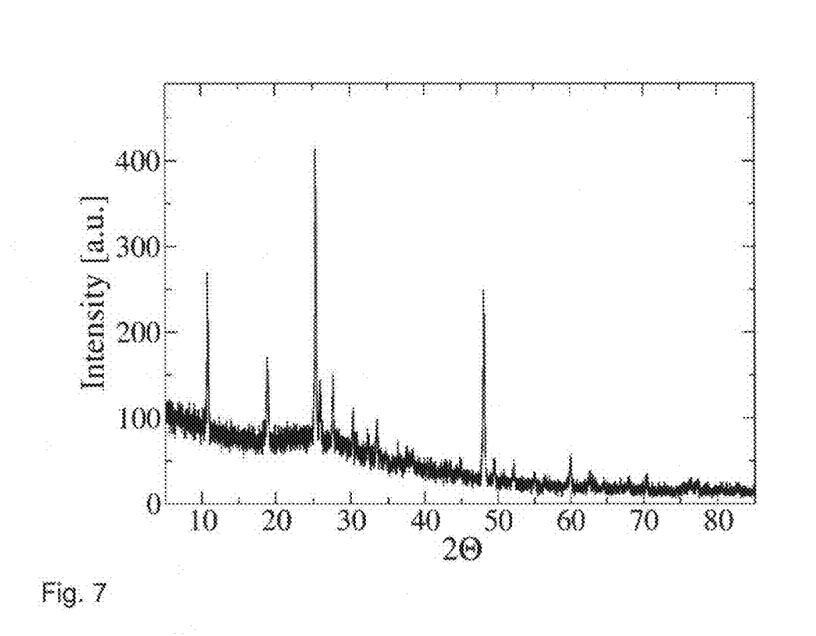
FIG. 7 shows the XRD pattern of $H_6V_3O_8$ synthesized electrochemically 100 A/kg (NH4Cl aqueous electrolyte and zinc anode).
Figure 8:
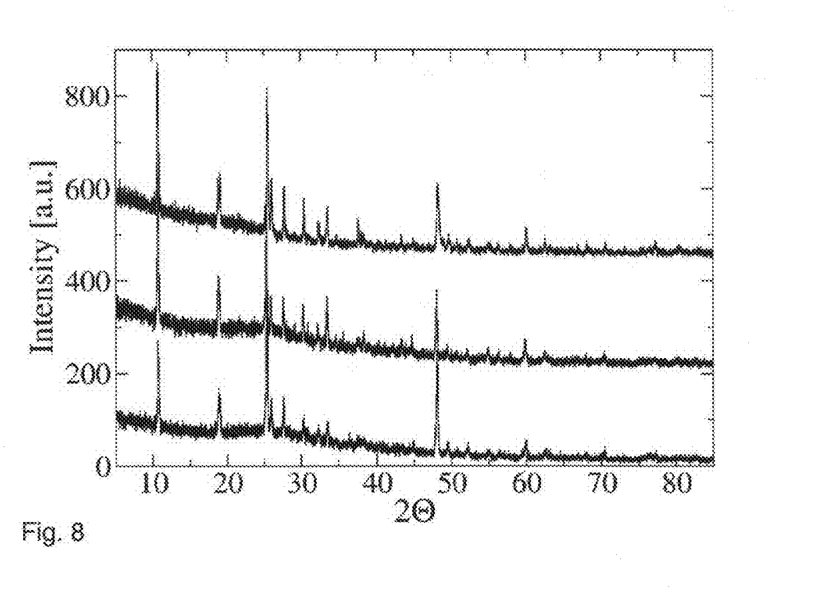
FIG. 8 shows the XRD patterns of $H_4V_3O_8$, $H_5V_3O_8$, and $H_6V_3O_8$ (from top to bottom) synthesized electrochemically at 100 Ah/kg (NH4Cl aqueous electrolyte and zinc anode).
Figure 9:
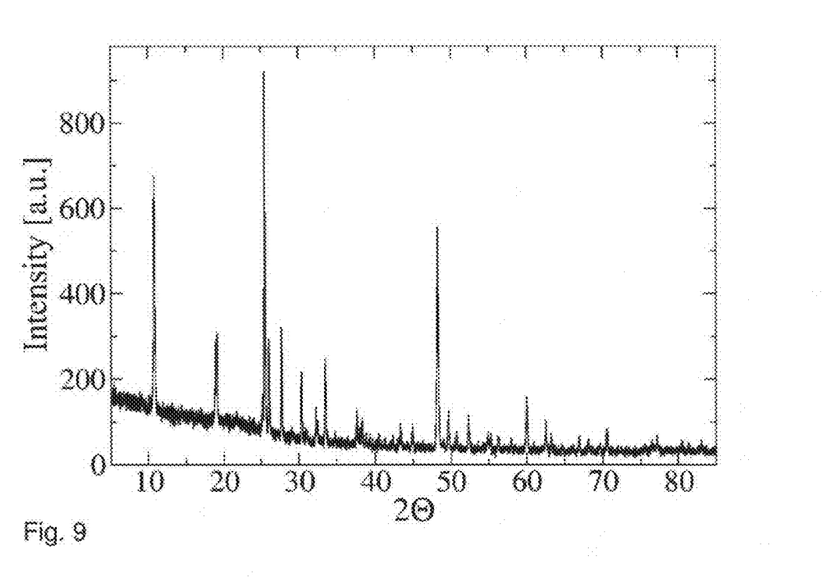
FIG. 9 shows the XRD pattern of $H_4V_3O_8$ synthesized with hydrazine and ascorbic acid

XRD pattern of differently protonated $H_4V_3O_8$, synthesized electrochemically at 100 A/kg (NH4Cl aqueous electrolyte and zinc anode) are shown in FIGS. 6 to 8, wherein FIG. 6 shows the XRD pattern of $H_5V_3O_8$, FIG. 7 of $H_6V_3O_8$, and FIG. 8 a comparison of the XRD pattern of $H_4V_3O_8$, $H_5V_3O_8$, and $H_6V_3O_8$ (from top to bottom).

Figure 10:
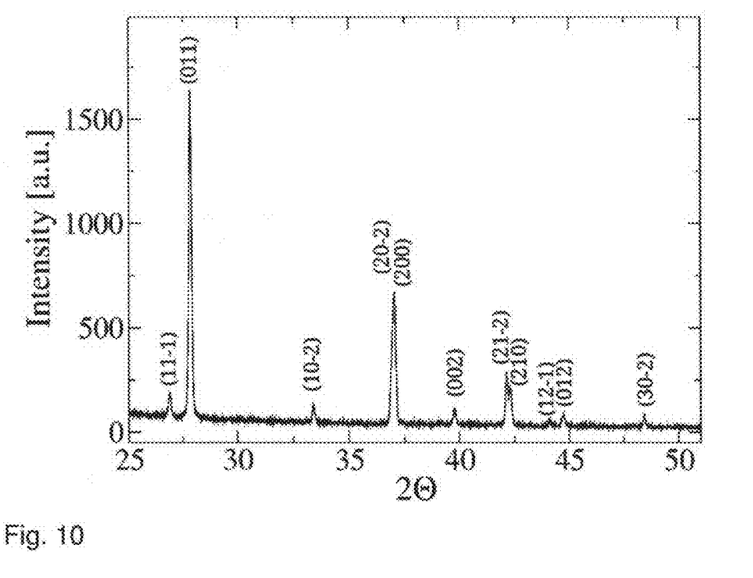
FIG. 10 shows the XRD pattern of the residue obtained after completed thermal decomposition of $H_4V_3O_8$ in the thermogravimetric experiment.
Figure 11:
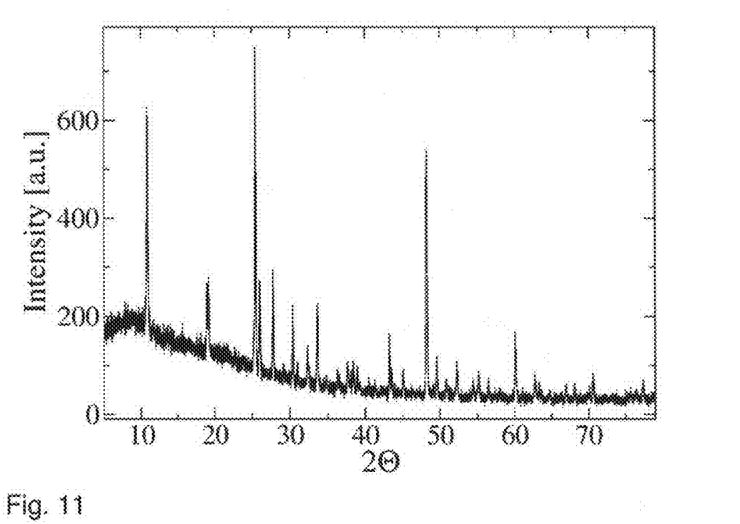
FIG. 11 shows the XRD pattern of $H_4V_3O_8$ synthesized with zinc and sulphuric acid.

XRD pattern of the residue obtained after completed thermal decomposition of $H_4V_3O_8$ in the thermogravimetric experiment (see below) are shown in FIG. 10.

Thermogravimetry Coupled to Mass Spectrometry 20 mg to 100 mg $H_4V_3O_8$ were placed in a corundum crucible inside the measurement chamber for evacuation. Heating from RT to 600° C. induced the thermal decomposition of $H_4V_3O_8$. $H_2O$ with m/z=18 was detected by the mass spectrometer as the only product.

Thermogravimetry with Differential Thermoanalysis (DTA)

Figure 1:
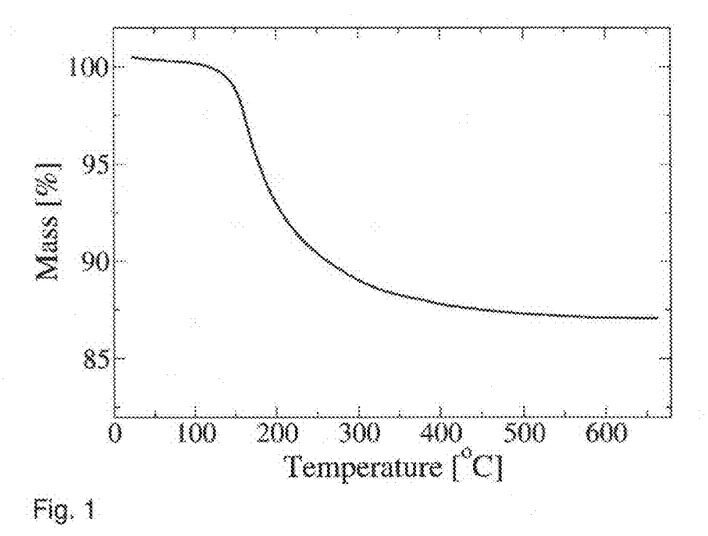
FIG. 1 shows mass loss as a function of the temperature in the thermogravimetric experiment. The data were recorded at a heating ramp of 10 K/min from RT to 600° C.
Figure 2:
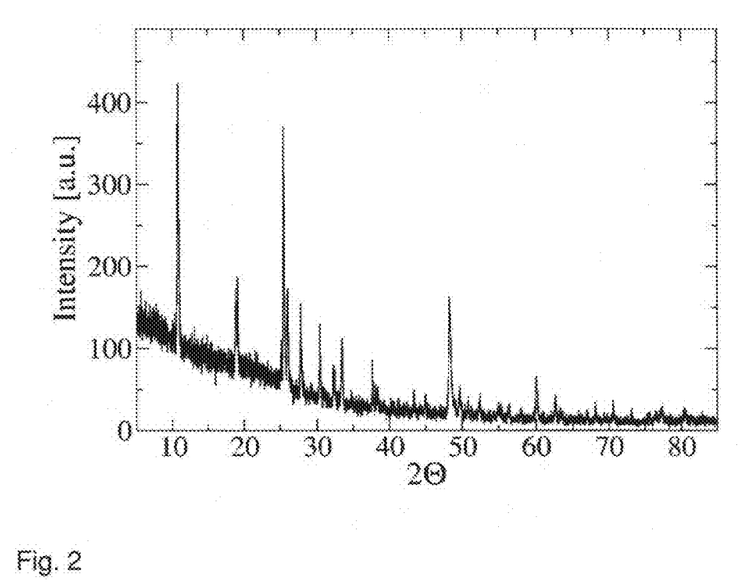
FIG. 2 shows the XRD pattern of $H_4V_3O_8$ synthesized electrochemically from $H_2V_3O_8$ at 100 A/kg (NH4Cl aqueous electrolyte and zinc anode).
Figure 3:
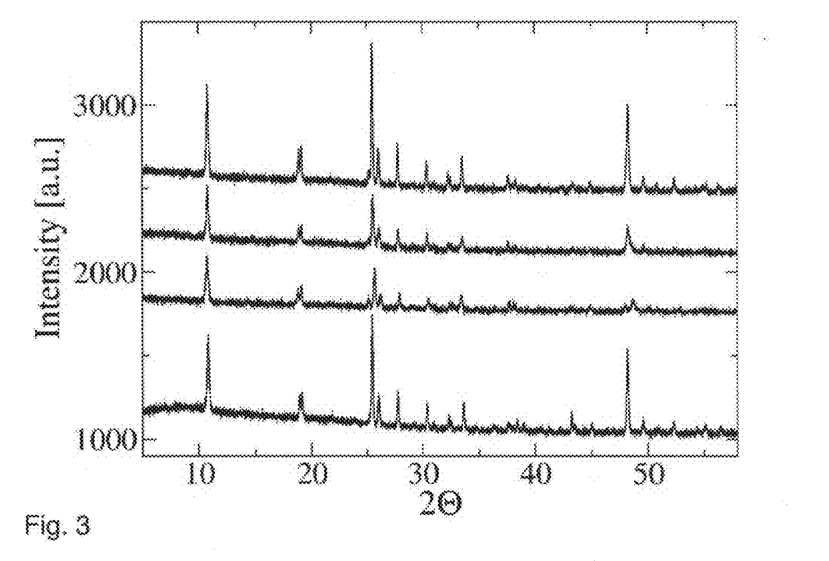
FIG. 3 shows the XRD patterns of $H_4V_3O_8$ obtained by various different procedures. From top to bottom: synthesis with hydrazine/ascorbic acid, electrochemical synthesis, synthesis with ascorbic acid/ammonium hydroxide, synthesis with $Zn/H_2SO_4$.
Figure 4:
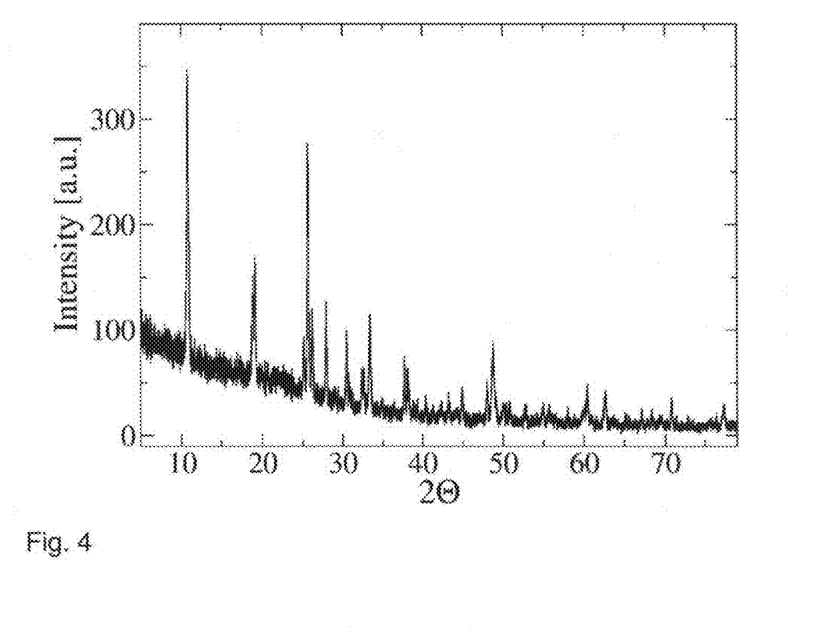
FIG. 4 shows the XRD pattern of $H_4V_3O_8$ synthesized with ascorbic acid and ammonium hydroxide.

20 mg to 100 mg $H_4V_3O_8$ were placed in a corundum crucible inside the measurement chamber and the atmosphere changed to pure nitrogen. Heating from RT to 600° C. induced the thermal decomposition of $H_4V_3O_8$ (see FIG. 1).

The mass loss was 13% by weight, which is consistent with the loss of two water molecules per $H_4V_3O_8$ formula unit.

The DTA shows an exothermic peak at 430° C. The residue was analyzed by XRD powder diffraction (see FIG. 10). All the reflexes matched the pattern of $VO_2$ (ICSD 15889).

Electrochemistry

General Remark $H_4V_3O_8$ can be successively lithiated and protonated (in any order) by changing the composition of the electrolyte (from LiCl to $NH_4Cl$ or to organic electrolyte) to $Li_xH_yV_3O_8$ with $2<x+y<6.8$ and $0<x<4$ and $0.5<y<6$.

The procedure implies disassembling the cell, rinsing the $Li_xH_yV_3O_8$ cathode and reassembling a cell with a fresh anode and the selected electrolyte.

$H_4V_3O_8$ is $Li_xH_yV_3O_8$ with x=0 and y=4.

Non Aqueous Lithium Battery

The galvanostatic measurements were performed in two electrodes cells connected to a potentiostat. Lithium metal was used as anode and reference electrode. The electrolyte consisted of 1M $LiPF_6$ in a mixture of ethylene carbonate and dimethyl carbonate (1:1 by weight). A Celgard® polypropylene separator and a silica foam separator were used.

The cathode was prepared by mixing the electroactive material with Super P®Li conductive carbon black (TIMCAL) in a 7:3 weight-ratio in THF. The mixture was homogenised a few seconds by ultrasound. Subsequently, the suspension was poured in a mortar and gently pestled until enough THF had evaporated, in order to transfer the wet solid onto a titanium current collector. The electrodes were dried in air, pressed by hand, and further dried in a transfer chamber for 2 hours in vacuum (with a minimum of 3 purges) while being transferred in said transfer chamber to an argon-filled glove box.

Such electrode may be further processed into a cell by covering the electrode with at least one separator and then filling the cell with electrolyte, completing the cell with an anode and then tightly closing the cell.

Figure 12:
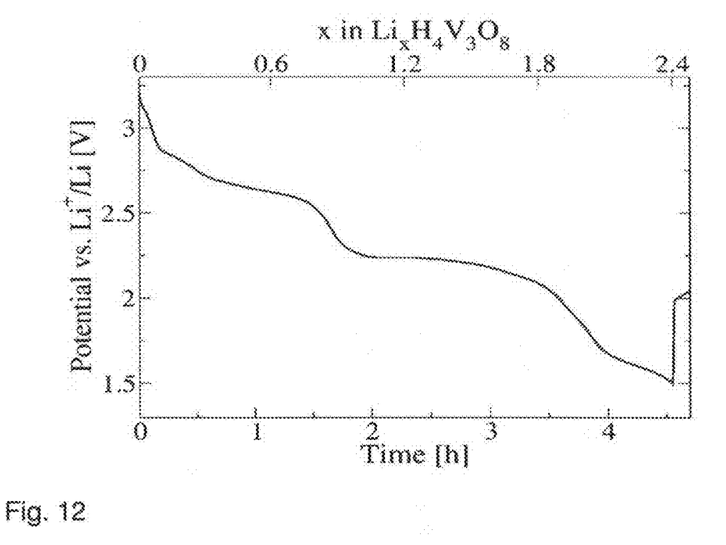
FIG. 12 shows the galvanostatic discharge curve of $H_4V_3O_8$ in a non aqueous Lithium battery setup at 50 A/kg.
Figure 13:
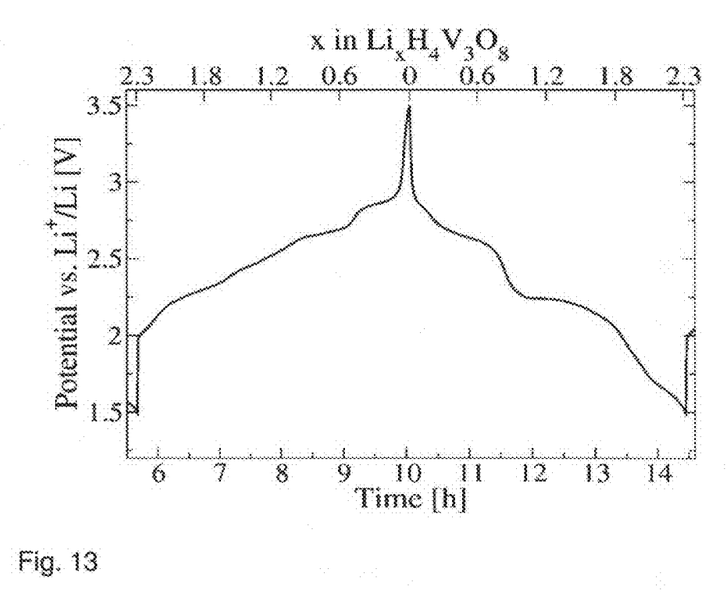
FIG. 13 shows the galvanostatic charge-discharge of $Li_{2.8}H_4V_3O_8$ in a non aqueous lithium battery setup at 50 A/kg.

A galvanostatic discharge curve of $H_4V_3O_8$ in such non aqueous lithium battery setup at 50 A/kg is shown in FIG. 12 and galvanostatic charge-discharge of $Li_{2.8}H_4V_3O_8$ in such non aqueous lithium battery setup at 50 A/kg in FIG. 13.

Aqueous Lithium and Proton Battery

The galvanostatic measurements were performed in two electrode cells connected to a potentiostat. A zinc plate was used as anode and reference electrode. The electrolyte consisted of either 3M LiCl or a 3M $NH_4Cl$, for a lithium ion cell or a proton cell, respectively. The electrolyte solutions were degassed by ultrasound.

The cathode was prepared by mixing the electroactive material with Super P® Li conductive carbon black (TIMCAL®) in a 7:3 weight-ratio in THF. The mixture was homogenised a few seconds by ultrasound. Subsequently, the suspension was poured in a mortar and gently pestled until enough THF had evaporated, in order to transfer the wet solid onto a titanium current collector. The electrodes were dried in air, pressed by hand, and further dried at least 30 min in vacuum (with a minimum of 2 purges).

Such electrode may be further processed into a cell by covering the electrode with at least one separator see non aqueous lithium battery above) and then filling the cell with electrolyte, completing the cell with an anode and then tightly closing the cell.

Figure 14:
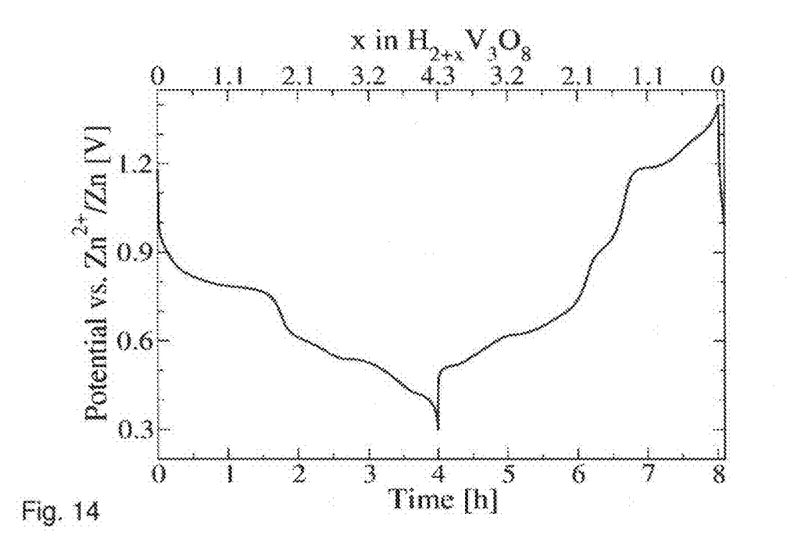
FIG. 14 shows the galvanostatic discharge-charge curve of $H_2V_3O_8$ to $H_6V_3O_8$ at 100 A/kg in aqueous electrolyte (3M NH4Cl and Zn anode).
Figure 15:
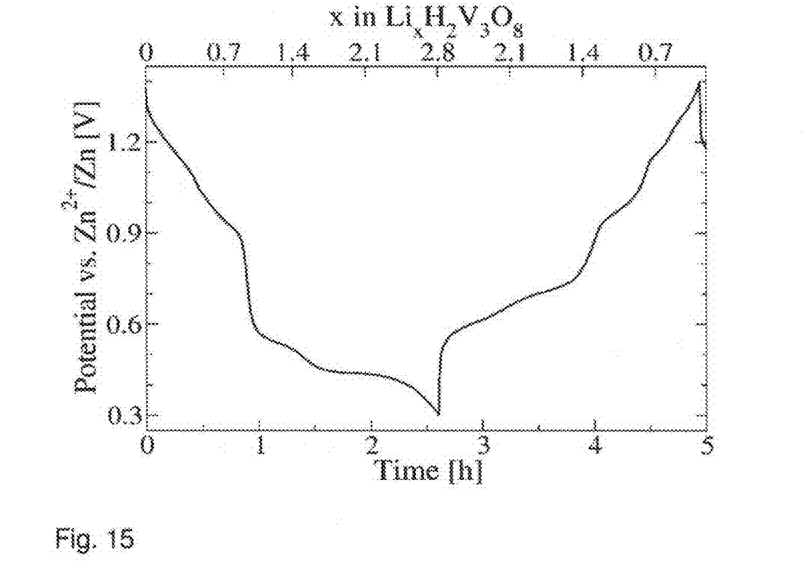
FIG. 15 shows the galvanostatic discharge-charge curve of $H_2V_3O_8$ to $Li_{2.8}H_2V_3O_8$ (obtained electrochemically as demonstrated in FIG. 13 at 100 A/kg in aqueous lithium battery (3M LiCl and Zn anode).
Figure 16:
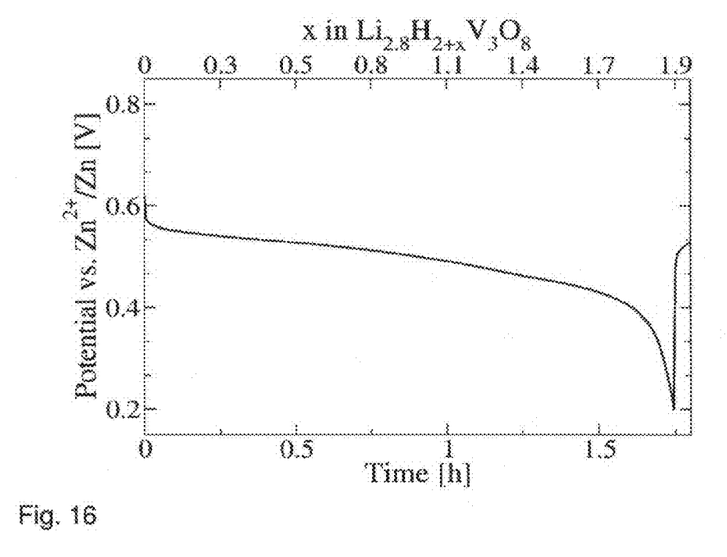
FIG. 16 shows the galvanostatic discharge of $Li_{2.8}H_2V_3O_8$ to $Li_{2.8}H_{3.9}V_3O_8$ in aqueous electrolyte (3M NH4Cl and Zn anode).
Figure 17:
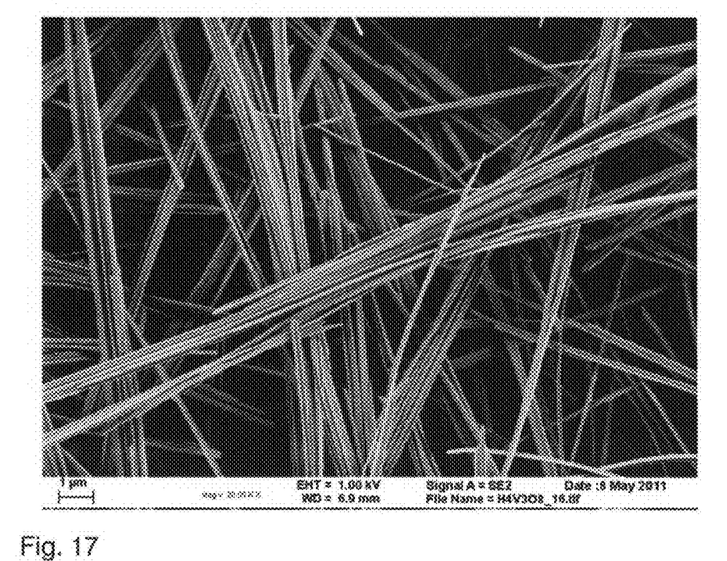
FIG. 17 shows a SEM micrograph of $H_4V_3O_8$ fibers.
Figure 18:
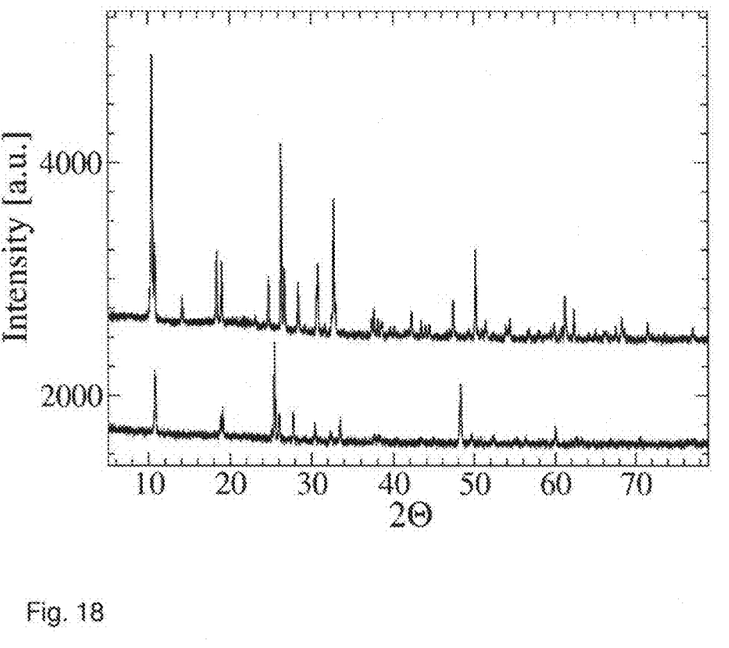
FIG. 18 shows XRD pattern of $H_2V_3O_8$ (top) and $H_4V_3O_8$ (bottom).

A galvanostatic discharge-charge curve of $H_2V_3O_8$ to $H_6V_3O_8$ at 100 A/kg in aqueous electrolyte (3M $NH_4Cl$ and Zn anode) is shown in FIG. 14, a galvanostatic discharge-charge curve of $H_2V_3O_8$ to $Li_{2.8}H_2V_3O_8$ (obtained electrochemically as demonstrated in FIG. 13) at 100 A/kg in aqueous lithium battery (3M LiCl and Zn anode) is shown in FIG. 15 and a galvanostatic discharge curve of $Li_{2.8}H_2V_3O_8$ to $Li_{2.8}H_{3.9}V_3O_8$ in aqueous electrolyte (3M NH4Cl and Zn anode) is shown in FIG. 16.

While there are shown and described presently preferred embodiments of the invention, it is to be distinctly understood that the invention is not limited thereto but may be otherwise variously embodied and practiced within the scope of the following claims.

REFERENCES

[1] Wu Li, J. R. Dahn and D. S. Wainwright, Science, 1994, vol 264(5162), 1115.
[2] WO 9525355 (A1)
[3] N. F. Mott, Review of Modern Physics, 1968, 40(4), 677.
[4] U.S. Pat. No. 4,457,161.
[5] Theobald F. and Cabala R., Comptes Rendus Hebdomadaires de l'Académie des Sciences, Série C, 1970, 270(26), 2138.
[6] Oka Y., T. Yao and N. Yamamoto, Journal of Solid State Chemistry, 1990, 89(2), 372.

[7] V. Legagneur, A. Le Gal La Salle, A. Verbaere, Y. Piffard and D. Guyomard, Electrochimica Acta, 2002, vol 47, 1153.
[8] ETH thesis 19382
[9] Howard T. Evans Jr. and Mary E. Mrose, Acta Crystallographica, 1957, vol 11, 56.

What is claimed is:

1. $H_4V_3O_8$ in the form of a layered compound with a structure belonging to a space group Pnma (n62).

2. $H_4V_3O_8$ according to claim 1, wherein $H_4V_3O_8$ has refined cell parameters determined by Rietveld refinement for orthorhombic $H_4V_3O_8$ (Pnma, n62) of $a=16.3306, b=3.7642,$ and $c=9.2705,$ and wherein the Rietveld refinement is performed with refined cell parameters for orthorhombic $H_2V_3O_8$ (Pnma, n62) of $a=17.1885, b=3.5796,$ and $c=9.249$ as a starting point.

3. $H_4V_3O_8$ according to claim 1 or 2,
wherein the $H_4V_3O_8$ is in form of a fiber having a width of less than 200 nm and a length of up to about 100 μm.

4. $H_4V_3O_8$ according to claim 1 or 2, obtained by a method comprising treating $H_2V_3O_8$ with a proton source and a reducing agent in a solvent.

5. $H_4V_3O_8$ according to claim 4, wherein the proton source and the reducing agent are selected from
 (i) ascorbic acid,
 (ii) ascorbic acid and hydrazine ($N_2H_2 \cdot H_2O$), or
 (iii) zinc and $H_2SO_4$.

6. An electroactive material in an aqueous and non aqueous battery,
 wherein the electroactive material comprises the compound of claim 1.

7. The electroactive material of claim 6,
 wherein the electroactive material is used in a mixture with a nanoparticulate conductive material.

8. A method for producing the electroactive material of claim 6 or 7, the method comprising:
 treating $H_2V_3O_8$ with a proton source and a reducing agent in a solvent.

9. A method for producing a cathode, the method comprising:
 mixing and homogenizing $H_4V_3O_8$ of claim 1 with conductive particles, thereby forming a first mixture;
 optionally gently pestling the mixture, evaporating solvent, or both gently pestling the mixture and evaporating the solvent to obtain desired fibre dimensions and viscosity, thereby forming a second mixture;
 coating a current collector with the first or second mixture; and
 drying a coated current collect.

10. The method of claim 9,
 wherein the conductive particles are conductive carbon black, and
 $H_4V_3O_8$ is mixed with the conductive carbon black in a 7:3 weight-ratio in a solvent.

11. $H_4V_3O_8$ according to claim 4,
 wherein the solvent is water.

12. $H_4V_3O_8$ according to claim 4,
 wherein the treating is performed at a temperature of 0 to 100° C.

13. The method of claim 10,
 wherein the solvent is tetrahydrofuran.

* * * * *